(12) United States Patent
Carmichael et al.

(10) Patent No.: US 9,106,925 B2
(45) Date of Patent: Aug. 11, 2015

(54) WEAV VIDEO COMPRESSION SYSTEM

(75) Inventors: Christopher Carmichael, Laguna Niguel, CA (US); Connie Jordan, Laguna Niguel, CA (US); Kristian Sandberg, Boulder, CO (US)

(73) Assignee: Ubiquity Holdings, Inc., Irvine, CA (US)

( * ) Notice: Subject to any disclaimer, the term of this patent is extended or adjusted under 35 U.S.C. 154(b) by 499 days.

(21) Appl. No.: 13/004,592

(22) Filed: Jan. 11, 2011

(65) Prior Publication Data

US 2011/0170607 A1 Jul. 14, 2011

Related U.S. Application Data

(60) Provisional application No. 61/294,011, filed on Jan. 11, 2010.

(51) Int. Cl.
| | |
|---|---|
| H04N 7/30 | (2006.01) |
| G06K 19/06 | (2006.01) |
| H04N 19/527 | (2014.01) |
| H04N 19/139 | (2014.01) |
| H04N 19/172 | (2014.01) |
| H04N 19/51 | (2014.01) |
| H04N 19/132 | (2014.01) |
| H04N 19/179 | (2014.01) |

(52) U.S. Cl.
CPC ........... *H04N 19/527* (2014.11); *H04N 19/132* (2014.11); *H04N 19/139* (2014.11); *H04N 19/172* (2014.11); *H04N 19/179* (2014.11); *H04N 19/51* (2014.11)

(58) Field of Classification Search
CPC ....................................................... H04N 7/30
USPC ....................................................... 375/240.18
See application file for complete search history.

(56) References Cited

U.S. PATENT DOCUMENTS

| | | | | | |
|---|---|---|---|---|---|
| 4,717,949 | A | * | 1/1988 | Eichenlaub | 348/54 |
| 5,040,878 | A | * | 8/1991 | Eichenlaub | 349/62 |
| 5,311,220 | A | * | 5/1994 | Eichenlaub | 348/55 |
| 5,505,433 | A | * | 4/1996 | Carmichael et al. | 254/211 |
| 5,537,144 | A | * | 7/1996 | Faris | 348/58 |
| 5,606,455 | A | * | 2/1997 | Eichenlaub | 359/463 |
| 6,008,484 | A | * | 12/1999 | Woodgate et al. | 250/201.1 |
| 6,069,650 | A | * | 5/2000 | Battersby | 348/59 |
| 6,118,584 | A | * | 9/2000 | Van Berkel et al. | 359/463 |
| 6,137,456 | A | * | 10/2000 | Bhagavatula et al. | 345/7 |
| 6,157,402 | A | * | 12/2000 | Torgeson | 348/59 |
| 6,275,254 | B1 | * | 8/2001 | Beeteson et al. | 348/59 |
| 6,351,280 | B1 | * | 2/2002 | Benton | 348/51 |

(Continued)

*Primary Examiner* — Dave Czekaj
*Assistant Examiner* — Kehinde O Abimbola
(74) *Attorney, Agent, or Firm* — Law Office of Scott C. Harris, Inc.

(57) ABSTRACT

Compression of a video by segmentation, transformation, transform encoding, difference encoding, and muxing. The segmentation looks at energies of the frames, in order to find three different things: black frames which have energy less than the specified amount, consecutive frames which have energy difference is less than the specified amount, and changes in scene which have energy difference is more than a specified amount. If there is little or no energy or energy difference, then the frame is replaced by an indication rather than information about the frame itself; either an indication of a black frames or an indication of no change between two adjacent frames. If there is much energy, then this is taken as the beginning of a new scene, and used as an area to change group of frames.

16 Claims, 1 Drawing Sheet

(56) References Cited

U.S. PATENT DOCUMENTS

| | | | |
|---|---|---|---|
| 6,510,002 B1* | 1/2003 | Tsang | 359/465 |
| 6,906,686 B2* | 6/2005 | Ishikawa | 345/1.1 |
| 7,230,759 B2* | 6/2007 | Huang et al. | 359/465 |
| 7,250,990 B2* | 7/2007 | Sung et al. | 349/15 |
| 7,268,747 B2* | 9/2007 | Taniguchi et al. | 345/6 |
| 7,382,425 B2* | 6/2008 | Sung et al. | 349/96 |
| 7,404,642 B2* | 7/2008 | Shestak et al. | 353/7 |
| 7,649,688 B2* | 1/2010 | Racette et al. | 359/464 |
| 7,936,824 B2* | 5/2011 | Lee | 375/240.19 |
| 7,953,452 B2* | 5/2011 | Bailey et al. | 455/566 |
| 8,032,113 B2* | 10/2011 | Bailey et al. | 455/406 |
| 8,040,216 B2* | 10/2011 | Jordan et al. | 340/5.2 |
| 8,054,329 B2* | 11/2011 | Shestak et al. | 348/57 |
| 8,089,563 B2* | 1/2012 | Girgensohn et al. | 348/700 |
| 8,090,025 B2* | 1/2012 | Sakazume | 375/240.16 |
| 8,149,272 B2* | 4/2012 | Evans et al. | 348/51 |
| 8,155,947 B2* | 4/2012 | Bailey et al. | 704/8 |
| 8,170,239 B2* | 5/2012 | Bailey et al. | 381/119 |
| 8,265,707 B2* | 9/2012 | Carmichael et al. | 455/566 |
| 8,331,023 B2* | 12/2012 | Wu et al. | 359/464 |
| 2001/0016008 A1* | 8/2001 | Bahl et al. | 375/240.18 |
| 2002/0097252 A1* | 7/2002 | Hirohata | 345/690 |
| 2002/0146073 A1* | 10/2002 | Clark et al. | 375/240.26 |
| 2004/0221311 A1* | 11/2004 | Dow et al. | 725/52 |
| 2005/0134762 A1* | 6/2005 | Sung et al. | 349/96 |
| 2005/0195334 A1* | 9/2005 | Yeh et al. | 348/700 |
| 2006/0088224 A1* | 4/2006 | Lee | 382/240 |
| 2006/0114998 A1* | 6/2006 | Barrau | 375/240.19 |
| 2006/0284978 A1* | 12/2006 | Girgensohn et al. | 348/143 |
| 2006/0288291 A1* | 12/2006 | Lee et al. | 715/723 |
| 2007/0268968 A1* | 11/2007 | Sakazume | 375/240.16 |
| 2008/0025593 A1* | 1/2008 | Ajioka | 382/141 |
| 2008/0084934 A1* | 4/2008 | Agrawal | 375/240.27 |
| 2008/0091529 A1* | 4/2008 | Bailey et al. | 705/14 |
| 2008/0106638 A1* | 5/2008 | Bailey et al. | 348/384.1 |
| 2008/0106639 A1* | 5/2008 | Bailey et al. | 348/426.1 |
| 2008/0139229 A1* | 6/2008 | Bailey et al. | 455/466 |
| 2008/0140383 A1* | 6/2008 | Bailey et al. | 704/8 |
| 2008/0182550 A1* | 7/2008 | Bailey et al. | 455/406 |
| 2008/0207318 A1* | 8/2008 | Bailey et al. | 463/31 |
| 2008/0214168 A1* | 9/2008 | Bailey et al. | 455/415 |
| 2008/0222686 A1* | 9/2008 | Bailey et al. | 725/105 |
| 2008/0239067 A1* | 10/2008 | Lipton | 348/54 |
| 2008/0260184 A1* | 10/2008 | Bailey et al. | 381/119 |
| 2008/0299956 A1* | 12/2008 | Bailey et al. | 455/414.3 |
| 2009/0074055 A1* | 3/2009 | Crotty et al. | 375/240.01 |
| 2009/0153652 A1* | 6/2009 | Barenbrug | 348/54 |
| 2009/0153962 A1* | 6/2009 | Okada et al. | 359/488 |
| 2009/0167846 A1* | 7/2009 | Niioka et al. | 348/54 |
| 2009/0213299 A1* | 8/2009 | Ito et al. | 349/65 |
| 2009/0238264 A1* | 9/2009 | Wittig et al. | 375/240.03 |
| 2009/0278918 A1* | 11/2009 | Marcus et al. | 348/54 |
| 2010/0235865 A1* | 9/2010 | Jordan et al. | 725/60 |
| 2010/0255827 A1* | 10/2010 | Jordan et al. | 455/414.1 |
| 2010/0255876 A1* | 10/2010 | Jordan et al. | 455/556.1 |
| 2010/0259604 A1* | 10/2010 | Surman | 348/54 |
| 2010/0309296 A1* | 12/2010 | Harrold et al. | 348/54 |
| 2011/0102558 A1* | 5/2011 | Moliton et al. | 348/54 |
| 2011/0170607 A1* | 7/2011 | Carmichael et al. | 375/240.19 |
| 2011/0216175 A1* | 9/2011 | Shimoyama et al. | 348/56 |
| 2011/0217020 A1* | 9/2011 | Bailey et al. | 386/278 |
| 2011/0222787 A1* | 9/2011 | Thiemert et al. | 382/225 |
| 2011/0230217 A1* | 9/2011 | Bailey et al. | 455/466 |
| 2011/0298904 A1* | 12/2011 | Okuda et al. | 348/51 |
| 2011/0304716 A1* | 12/2011 | Sato et al. | 348/54 |
| 2012/0054813 A1* | 3/2012 | Carmichael | 725/110 |
| 2012/0079427 A1* | 3/2012 | Carmichael et al. | 715/825 |
| 2012/0081601 A1* | 4/2012 | Carmichael | 348/441 |
| 2012/0188348 A1* | 7/2012 | Umeda et al. | 348/54 |

* cited by examiner

WEAV VIDEO COMPRESSION SYSTEM

This application claims priority from Provisional application Ser. No. 61/294,011, filed Jan. 11, 2010, the entire contents of which are herewith incorporated by reference.

BACKGROUND

Video compression can be used for various functions including allowing more data to be sent over a fixed bandwidth channel. It is also desirable to use fixed bandwidth channels such as a cellular network to send and receive videos.

SUMMARY

The present system describes compressing video in a special way to obtain good quality streams at a higher rate than possible using existing techniques.

BRIEF DESCRIPTION OF THE DRAWINGS

These and other aspects will now be described in detail with reference to the accompanying drawings, wherein.

DETAILED DESCRIPTION

An embodiment used herein describes compressing data for the purpose of storing it or sending it over a network.

We describe the compression of a video clip, which is typically formed of a sequence of frames. The dimensions that span each frame are referred to as the spatial dimension. The time dimension is referred to as the temporal dimension.

The different methods described in this document can be combined into a fixed number of steps that specify all steps how the uncompressed input data is converted to a compressed output bit stream. One such complete sequence of steps is referred to as a protocol.

Figure 1:
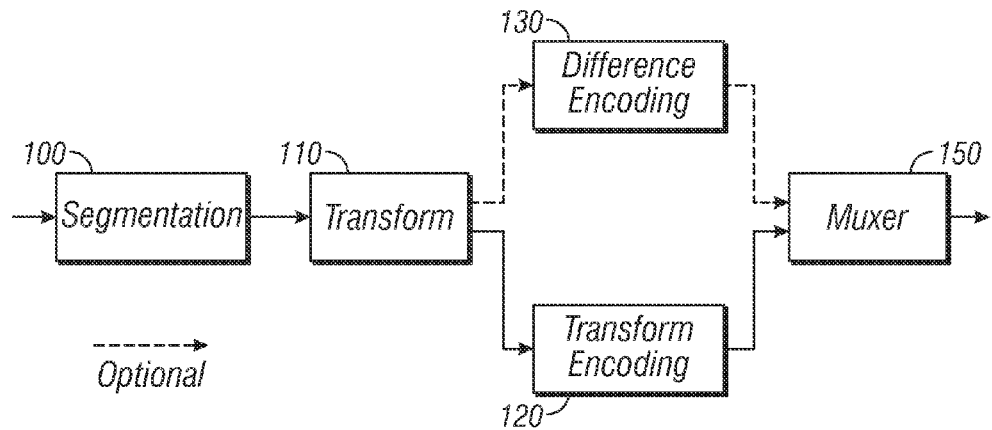
FIG. 1 shows a flow diagram.

According to an embodiment shown in FIG. 1, the compression technique is formed of five main parts: segmentation 100, transformation 110, transform encoding 120, difference encoding 130, and muxing 150.

Segmentation at 100 operates by taking the raw video stream and extracting pieces from the stream that can be independently processed by the transformation step. The segmentation can be carried out, for example, by extracting a group of frames, downsampling in time, and estimating the global motion for compensation.

The transformation at 110 and applies a transform to each data set that has been extracted by the segmentation 100. Example transformations can include applying a 3D wavelet transform on each GOF color channel, applying a 2D wavelet transform on each frame and a Singular Value Decomposition (SVD) in time, and/or applying a 2D wavelet transform on a subset of frames, and then use interpolation to estimate an intermediate frame as explained herein.

The difference encoding at 130 can be additionally or alternatively compared to non-thresholded data called true data. That is, the difference encoding may be carried out as an optional step using a technique that is optimized for compressing difference data. This is described also in more detail herein.

The multiplexing 150 is the final step in the process, and operates to merge the encoded data into one consecutive bitstream.

More detail about many of these steps are carried out herein.

Figure 2:
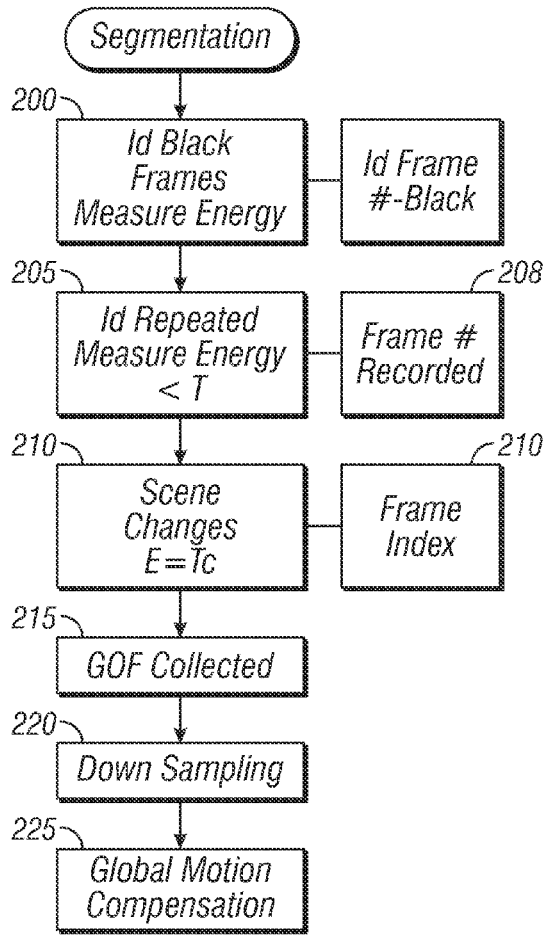
FIG. 2 shows a diagram of segmentation.

The goal of the segmentation process is to decompose the full movie into smaller pieces, such that each piece can be transformed independently in the transformation step. The extraction starts in identifying black frames at 200 in FIG. 2. These black frames are sometimes inserted at the beginning or end of the scene, and while not directly visible to the user, they can be used according to this technique. The black frames often are used to attempt to create softer transitions between the different scenes. The frames cannot be simply removed, since they are needed in order to keep the video synchronized with the soundtrack. However, the inventors recognize that it is not necessary to encode the black frames since they are all black. Instead, information about when they are found can be used and reinserted in the decoding step.

In one embodiment the black frames can be found by measuring the energy of each frame, where the energy is found/defined as the Euclidean norm of the data set.

At 205, the system identifies the repeated frames. Many times during a video, frames that are exact copies of the previous frame are repeated, for example when there is no movement or other change for some period of time. As part of the segmentation step at 205, the frame number is recorded at 206. The repeated frames are removed before being encoded, using the detection at 205/206. Locations of the repeated frames are written to the header so that the decoder can simply read the location of the repeated frames and instruct the player to duplicate the frames. As with the identification of black frames, 205 can be done by measuring energy, and a frame is recorded as being repeated if the energy difference from the previous frame is less than a threshold referred to herein as T.

Scene changes can also be modified at 210. The scene changes are identified by measuring the energy of the difference between consecutive frames. If the energy exceeds a fixed threshold $T_C$, then the two frames are defined as belonging to different scenes. The frame index for scene changes is recorded, and represent that the movie is changing scenes at this time.

At 215, group of frames are extracted, at the time when black and repeated frames have been removed or skipped at 200 and 205.

The groups of frames can use rules that are applied in certain orders. For example, the rules can specify that
1. A GOF cannot contain frames from different scenes.
2. A GOF cannot contain more frames than a fixed maximum number of frames, where the number of frames that is fixed can be set by the hardware that can be used to store the information.

According to one embodiment, the length of a group of frame should be $2^K$ for some integer K in order to optimize the performance of the performance of the wavelet transform in time. The integer k is typically not larger than 5, which means that the maximum length of a GOF is 32 frames (corresponding to roughly 1.3 seconds of movie if the frame rate is 24 frames per second). If a GOF only contains 1 frame, such a frame is treated as a repeated frame (for simplicity) and not encoded.

Downsampling can then be carried out at 220 in both space and time. For example, each group of frames can be resized in a way to remove every second frame in the original group of frames. The frame may be also downsampled in space for example by extracting every second element in each direction. When downsampling is used, interpolation on the decoder side can be used to reconstruct the frame.

At 225, global motion compensation can be carried out to detect camera motion within the scene. The global motion compensation is carried out by first extracting a centered subset of the middle pixel frame in the group of frames. For example, if the frame size is 240-by-320 pixels, the center 192-by-256 pixels may be extracted from the middle frame.

Assuming that the GOF contains N frames, the Global Motion Compensation step is applied as follows:
1. Set refFrame=frame [$N_{frames}/2$]
2. For frame i=1, ..., $N_{frames}/2-1$:
   (a) Loop over shift vectors:
      i. Extract the shifted portion of frame [i]
      ii. Measure the difference between extracted portion of frame [i] and refFrame
      iii. If the difference is smaller than any previous difference, record the shift
   (b) Record the minimizing shift, and the corresponding extracted portion of frame [i]
   (c) Set refFrame=frame[i]
3. Set refFrame=frame[$N_{frames}/2$]
4. For frame i=$N_{frames}/2+1$, ..., $N_{frames}$:
   (a) Loop over shift vectors:
      i. Extract the shifted portion of frame [i]
      ii. Measure the difference between the extracted portion of frame [i] and refFrame
      iii. If the difference is smaller than any previous difference, record the shift
   (b) Record the minimizing shift, and the corresponding extracted portion of frame [i]
   (c) Set refFrame=frame [i]

The output of this operation is a sequence of subportions of each frame in the GOF, that are aligned such that they compensate for global motion (such as the motion introduced by a moving camera).

The borders (the size of which may be different for each frame), are also extracted. Hence, each GOF is formed of a motion compensated center portion, and a border portion. Both the center portion and the border portion are then sent to the transformation step.

The transforms which can be carried out include the following.

The wavelet transform can be used as a 1D transform (to compress a one-dimensional data set, such as data along a line), as a 2D transform (to compress a two-dimensional data set, such as a frame), and as a 3D transform (to compress a sequence of that 200. in both space and time). Embodiments can use three types of wavelets, the Daubechies 2 (Haar) filter, the Daubechies (5/3) biorthogonal, filter, and the Daubechies (9/7) biorthogonal filter. Other filters can also and alternately be used for this function.

The Singular Value Decomposition (SVD) can be used for compressing sequences of frames or blocks of similar nature (such as all frames within a scene). The SVD is used by first reshaping each element of the sequence into a column vector, and placing each such column vector into a column of a matrix. This matrix is referred to as the library matrix. The SVD is applied to this library matrix, and then the singular vectors are used as a basis for the library.

Line Representation can also be used.

Some data produced by the transformation step can be sufficiently represented by a so-called "line representation". For such data, the data is represented as a list of lines, where each line is represented with four attributes:
- The center of the line,
- the length of the line,
- the angle of the line, and
- a list of wavelet coefficients for the data sampled along the line.

The Poisson Transform can be used as an alternative to a 2D wavelet transform of a frame (or a subset of a frame)

To compute the Poisson transform of a data set, we extract the boundary values of the set, along with the Laplacian $$\Delta = \frac{\partial^2}{\partial x^2} + \frac{\partial^2}{\partial y^2}$$

applied to the interior of the set. We denote the Poisson transformed set as f. The transformed data f is typically compressed by a combination of quantization, wavelet transformation, and using the line representation.

The inverse Poisson transform of a Poisson transformed set, solves the equation $$\Delta u = f.$$

The solution u represents an approximation of the original data set. (If f is compressed using loss-less compression, then u equals the original data set.)

In practice the Poisson transform is applied by using a discrete representation of the Laplacian operator Delta, and the equation is solved using a fast numerical solver, such as the Fast Poisson Solver or a multigrid solver.

The transformation is then carried out in order to take the output data from the segmentation step and apply one or more of the transforms on that data at 110. The transform can allow the quantized data to be encoded using fewer bits than the original data which results in an effective compression of the data stream.

According to one embodiment, the transformation at 110 uses color transformation followed by space and time transformation. The space and time transformation can be done in any order.

Figure 3:
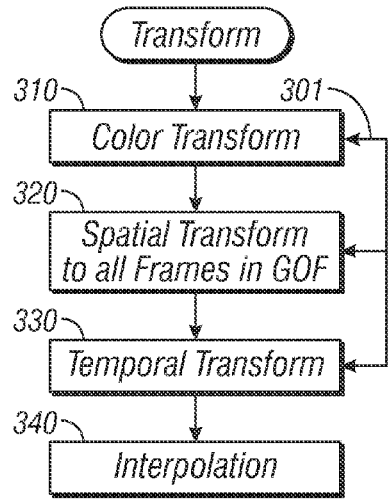
FIG. 3 shows a transformation flowchart.

The transformation is carried out as shown in FIG. 3. First, at 310, the color transformation is carried out. Assuming that the input to the device is in RGB format, applicants recognize that channel decomposition is unsuitable for compression purposes. The colors are therefore transformed into the chroma/luma CYY format as follows:

$$\begin{bmatrix} C \\ Y_1 \\ Y_2 \end{bmatrix} = \begin{bmatrix} 0.299 & 0.587 & 0.114 \\ -0.299 & -0.587 & 0.886 \\ 0.701 & -0.587 & -0.114 \end{bmatrix} = \begin{bmatrix} R \\ G \\ B \end{bmatrix}$$

This transformation can be rescaled to integers if desired. Also, other transforms can alternatively be used.

At 320, a spatial transformation is applied to every frame in the group of frames. A typical time when this is applied is after the color transform as shown in the flowchart of FIG. 3. However, this can be applied either before or after that, and before or after the temporal transform 330 which is discussed herein. The arrows 301 are provided to show that these transforms can be carried out in any order.

This transform is applied to each color channel independently. This can use either the two-dimensional wavelet transform discussed previously or the Poisson transform discussed previously.

At 330, the temporal transform is applied in the temporal dimension of the group of frames. As with the spatial transform, this is applied to each color channel independently. The temporal transform can use either the one-dimensional wavelet transform discussed above or the singular value decomposition discussed above.

A temporal Wavelet Transform can be used for the temporal wavelet transform, a 1D wavelet transform is applied for each time series obtained by extracting the data from a fixed pixel location in each frame. Hence, if each frame is of the dimension Ny-by-Nx and the GOF contains Nframes frames, then we apply NyNx 1D wavelet transforms, where each wavelet transform is applied on a data array with Nframes elements.

The temporal SVD Transform can also be used for the SVD transform, we create a library where each item (column vector) corresponds to one frame in the GOF reshaped to a column vector. Hence, if each frame is of the dimension Ny-by-Nx and the GOF contains Nframes frames, the library matrix has the dimension NyNx-by-Nframes. The output of this transformation has two matrices: the NyNx-by-Nframes containing the singular vectors (multiplied with their singular values), and the matrix containing the projection coefficients of size Nframes-by-Nframes.

The singular vectors are then re-shaped to 2D data sets, and then transformed by any of the methods discussed herein. The matrix with projection coefficients is typically small, but can in principle be compressed as well.

Interpolation can be carried out at 340, and the interpolation may be used for example when temporal downsampling is applied in the segmentation step. In this case, the missing intermediate frames are restored on the decoder side using the interpolation of the missing frames. This does not require any additional operations on the encoder side. However, the encoder can produce some data which assists decoding on the decoder side. For example, this can decompose the data of the intermediate frames into blocks and apply motion compensation to each block with respect to the keyframes. The motion vector for each block can be recorded. Additionally or alternatively this can project each intermediate frame onto singular vectors based on keyframes and record the projection coefficients.

Transform encoding at 120 is carried out after the data has been transformed. The transform encoding can threshold and quantize the data as described herein. For example, the thresholding level can be uniform throughout the entire transform data set in one embodiment. In another embodiment, the data can be adjusted to take advantage of the fact that the human visual system is less sensitive for information in certain spatial and temporal frequency bands.

After quantization, the data is encoded into a bit stream using some type of entropy encoding. The encoding of the quantized data is decomposed into sub tasks including encoding the location of the nonzero data coefficient, encoding the sign of a nonzero data coefficient, and encoding the magnitude of a nonzero data coefficient The methods used for these tasks depends on which transformations that were used in the transformation step. For example, if spatially encoded wavelet transform data is used for the transformation, then a binary image is created where the location of nonzero coefficients are set to one and all other locations are set to zero. The binary image is encoded, for example using a quad tree data structure or spatial orientation tree data structure. The signs of the nonzero data coefficients are reasonably randomly distributed and hence are not entropy coded. The magnitudes of the nonzero data coefficients are encoded using Huffman coding, or arithmetic coding, or by extracting the most significant bit for each number.

If the most significant bit technique is used, that that is encoded using the prefix code while the remaining bits are appended to the bitstream.

Many of the transformation techniques may result in one or more frames that have an edge like appearance where the edges of the original image are enhanced. The most prominent lines in the image can be detected and encoded using a line representation. Any remaining nonzero pixels are then encoded by recording their location sign and value.

After the data has been transformed and quantized, difference encoding may optionally be carried out at 130. The difference encoding subtracts the actual data from the uncompressed data. The resulting data is referred to as "difference data". The difference data may be compressed and added to the bitstream in one embodiment. Differences can be encoded using one of two methods, depending on which transformation method has been used.

If the data has been compressed using a spatial wavelet transform, then the difference data typically has an edge map nature, and the edge map coding is used. If the data has been compressed using the Poisson transform, the difference data is typically smooth and low-frequency and can be wavelet transformed.

Different embodiments, referred to herein as "protocols" combine sequences of operations from the above. A few different embodiments are specifically described with each of these embodiments being a specific combination of different structure.

Protocol 11.0 uses a segmentation where the group of frames are extracted without global motion compensation. A maximum of 32 frames is allowed within each group of frames. The transform for this protocol uses color converted into the CYY format. Each channel results in the 3-D data set and 3-D wavelet transforms are applied to each data set. Transform coding is used to convert each two-dimensional frame in the wavelet transform volume using entropy coding. No difference encoding is used.

Protocol 11.1 extracts groups of frames without global motion compensation and allows a maximum of 32 frames within each group of frames. Each group of frames is downsampled by a factor of two in each dimension resulting in a group of frames that has at most 16 frames. The decoding side interpolates intermediate data using linear interpolation from the previously decoded data. The transform in this protocol operates to color convert each group of frames to the CYY format. Each data results in a 3-D data set and 3-D wavelet transforms are applied to each data set transform coding transforms each two-dimensional frame in the wavelet volume using entropy coding. No difference encoding is used.

Protocol 11.2 extracts the groups of frames without global motion compensation and allows a maximum of 32 frames within each group of frames. Each group of frames is then down sampled by a factor of 10 in each dimension to create at most 16 frames. Decoding is carried out by interpolating the intermediate data using linear interpolation. The transform is carried out by each group of frames being color converted to the CYY format. Each channel than the results in the 3-D data set and 3-D wavelet transforms are applied to each data set. After transformation the last eight frames of the two Luma YY channels are set to zero. This takes advantage of human inability to notice rapid color variations in these two channels. Each 2-D frame in the wavelet transform volume is entropy coded and no difference encoding is used.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other combinations of codes can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form.

When operated on a computer, the computer may include a processor that operates to accept user commands, execute instructions and produce output based on those instructions. The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or any old or new standard promulgated by the Institute of Electrical and Electronics Engineers ("IEEE") including IEEE 488 general-purpose interface bus ("GPIB"), and the like.

A computer system used according to the present application preferably includes a main memory and may also include a secondary memory. The main memory provides storage of instructions and data for programs executing on the processor. The main memory is typically semiconductor-based memory such as dynamic random access memory ("DRAM") and/or static random access memory ("SRAM"). The secondary memory may optionally include a hard disk drive and/or a solid state memory and/or removable storage drive for example an external hard drive, thumb drive, a digital versatile disc ("DVD") drive, etc.

At least one possible storage medium is preferably a computer readable medium having stored thereon computer executable code (i.e., software) and/or data thereon in a non-transitory form. The computer software or data stored on the removable storage medium is read into the computer system as electrical communication signals.

The computer system may also include a communication interface. The communication interface allows' software and data to be transferred between computer system and external devices (e.g. printers), networks, or information sources. For example, computer software or executable code may be transferred to the computer to allow the computer to carry out the functions and operations described herein. The computer system can be a network-connected server with a communication interface. The communication interface may be a wired network card, or a Wireless, e.g., Wifi network card.

Software and data transferred via the communication interface are generally in the form of electrical communication signals.

Computer executable code (i.e., computer programs or software) are stored in the memory and/or received via communication interface and executed as received. The code can be compiled code or interpreted code or website code, or any other kind of code.

A "computer readable medium" can be any media used to provide computer executable code (e.g., software and computer programs and website pages), e.g., hard drive, USB drive or other. The software, when executed by the processor, preferably causes the processor to perform the inventive features and functions previously described herein.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method, comprising:

using a computer for compressing a video formed of multiple frames, said compressing comprising:

segmenting pieces from the video into groups of frames, each group of frames having only information from a single scene, and each group of frames having less than $2^K$ frames, where K is an integer, said segmenting comprising measuring an energy of a difference between consecutive frames, and when the energy of the difference exceeds a fixed threshold, then defining one of the pieces as belonging to a new group of frames, said segmenting also finding substantially black frames that have a total amount of energy that is less than a specified threshold representing a substantially black frame and removing said substantially black frames, to form groups of frames where no group of frames is formed by black frames, and where each said group of frames only has frames that less than a specified energy difference between them;

applying a transform to said groups of frames that have been extracted by the segmenting and from which the black frames have been removed, to form transformed pieces;

encoding the transformed pieces to form encoded transformed pieces; and merging the encoded transformed pieces into a bitstream.

2. The method as in claim 1, further comprising identifying frames which have energies which differ from less than one another by a specified amount, and wherein said segmenting marks said frames in a way that prevents said frames from being separately transformed.

3. The method as in claim 1, further comprising extracting the group of frames using said segmenting.

4. The method as in claim 3, further comprising downsampling said video by removing some frames from said group of frames.

5. The method as in claim 1, wherein said applying a transform comprises applying a Poisson Transform which extracts boundary values of a set formed by said pieces, along with a Laplacian function $$\Delta = \frac{\partial^2}{\partial x^2} + \frac{\partial^2}{\partial y^2}$$

applied to an exterior of a frame.

6. The method as in claim 5, wherein said Poisson transform is compressed by a combination of quantization, wavelet transformation, and using a line representation.

7. A method, comprising:

using a computer for compressing a video formed of multiple frames, said compressing comprising:

segmenting the video into pieces;

applying a transform to said pieces that have been extracted by the segmenting, said transform being a Poisson Transform which extracts boundary values of a frame set formed by said pieces, along with a Laplacian $$\Delta = \frac{\partial^2}{\partial x^2} + \frac{\partial^2}{\partial y^2}$$

applied to an exterior of a frame to form a transformed set;

encoding the transformed set to form an encoded transformed set; and merging the encoded transformed set into a bitstream.

8. The method as in claim 7, wherein said segmenting comprises finding substantially black frames that have a total amount of energy that is less than a specified threshold representing a substantially black frame, and removing said substantially black frame from the pieces that are formed by the segmenting, and also where said pieces are within frames that have less than a specified energy difference between two consecutive frames.

9. The method as in claim 7, further comprising identifying frames which have energies which differ from less than one another by a specified amount, and wherein said segmenting marks said frames in a way that prevents said frames from being separately transformed.

10. The method as in claim 7, further comprising extracting a group of frames using said segmenting.

11. The method as in claim 10, further comprising downsampling said video by removing some frames from said group of frames.

12. The method as in claim 7, wherein said Poisson transform is compressed by a combination of quantization, wavelet transformation, and using a line representation.

13. The method as in claim 12, wherein said line representation is data that is represented as a list of lines, where each line is represented by at least a center of the line, a length of the line, an angle of the line, and a list of wavelet coefficients for the data sampled along the line.

14. A method, comprising:

using a computer for playing back a video formed of multiple frames, said decompressing said multiple frames, said decompressing comprising:

obtaining a coded portion indicative of a piece of said video;

desegmenting pieces from the video from groups of frames, each group of frames having only information from a single scene, and each group of frames having less than $2^K$ frames, where K is an integer, said desegmenting comprising receiving frames where an energy of a difference between consecutive frames of a group of frames does not exceed a fixed threshold, and wherein if the energy of a difference between consecutive frames exceeds the difference, then the frames are defined as belonging to a new group of frames, identifying a first code within said coded portion which represents that one of said frames is substantially black frame and adding a black frame into the decoded video such that no group of frames is formed by black frames, and not carrying out any decoding during a time represented by said first code, but producing information that is indicative of the black frame based on said first code;

and where each said group of frames only has frames that less than a specified energy difference between them;

decoding transformed groups of frames that have been extracted by the segmenting and from which the black frames have been removed, to form forming frames which represent decompressed frames including said black framed by detransforming said coded portion and forming a video.

15. The method as in claim 14, further comprising using said computer for finding a second code within said coded portion that identifies frames which have energies which differ from less than one another by less than a specified amount, not carrying out any decoding during a time represented by said second code, but producing information that is indicative of a repeated frame based on said first code without providing information on the frame themselves, and repeating said frames based on said second codes.

16. The method as in claim 14, wherein said decompressing comprises applying a Poisson inverse Transform.

* * * * *